Oct. 31, 1939.　　A. R. THOMPSON　　2,178,007
PEELING MACHINE
Filed Jan. 3, 1938
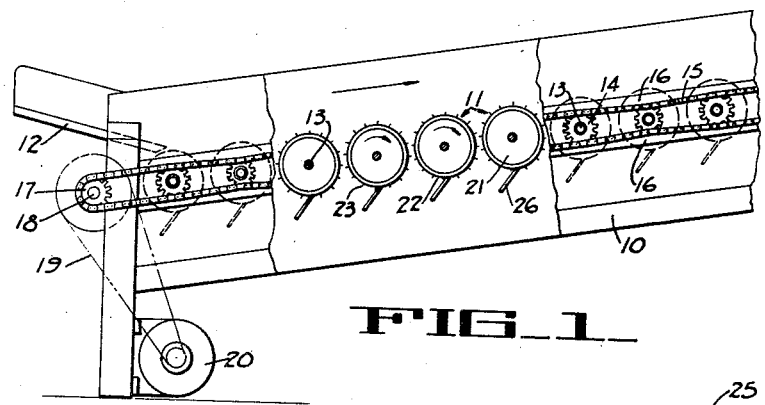
FIG_1_
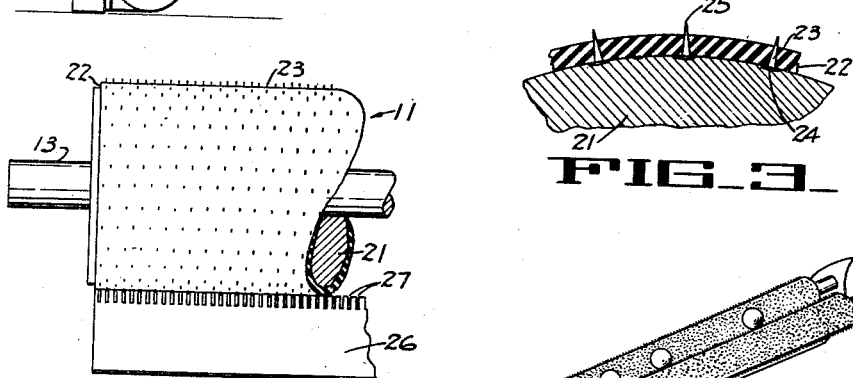
FIG_2_
FIG_3_
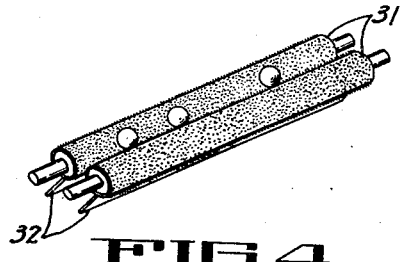
FIG_4_
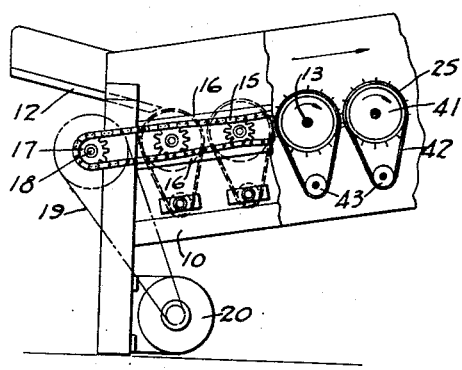
FIG_6_
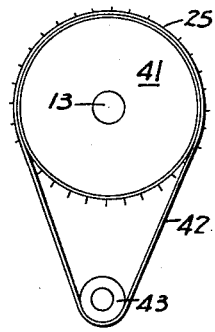
FIG_5_
INVENTOR.
ALBERT R. THOMPSON.
BY Philip G. Minnis
ATTORNEY.

Patented Oct. 31, 1939

2,178,007

UNITED STATES PATENT OFFICE 2,178,007

PEELING MACHINE

Albert R. Thompson, Los Gatos, Calif., assignor to Food Machinery Corporation, San Jose, Calif., a corporation of Delaware Application January 3, 1938, Serial No. 183,149

6 Claims. (Cl. 146—49)

This invention relates to peeling machines for fruits, vegetables, and the like of the character having a thin outer skin which is loose or can be loosened easily by treatment, such as tomatoes, onions, and the like, and is concerned more particularly with a machine of this character which will handle the product in bulk to carry out a rapid and thorough peeling operation.

Attempts have been made to provide a peeling machine for products of the character referred to, where the cohesive strength of the peel is stronger than its adhesive connection to the meat, or under layer of the product. However, to my knowledge, no practical, successful machine has been devised which can be used for commercial operation, principally because of the delicate character of the fruit, and the difficulty of handling the fruit and holding it in position during a peeling operation. The machine of my invention overcomes the difficulties heretofore found by making no attempt to handle any individual unit of the product as such, and by handling the product in bulk while accomplishing an effective and thorough peeling operation without injury to the fruit.

It is a general object of the invention, therefore, to provide a machine which will successfully peel products such as tomatoes and onions, in a thorough manner which is practical for commercial operation.

Another object of my invention is to provide a peeling machine in which the product is handled in bulk with no attempt to treat any individual unit as such.

Another object of my invention is to provide a peeling machine of the character referred to which is continuous in its operation, and can accommodate a continuous flow of product therethrough.

Other objects of the invention will appear from the following description of a preferred embodiment taken in connection with the accompanying drawing, in which Fig. 1 is a fragmentary side elevation of a peeling machine, the view being partially broken away to show certain of the peeling rolls with their shafts in section.

Fig. 2 is an enlarged, fragmentary elevation of a peeling roll, and of the cleaning plate associated therewith.

Fig. 3 is an enlarged detailed section of a part of a peeling roll.

Fig. 4 is a diagrammatic perspective view of a modified form of peeling machine constructed in accordance with my invention.

Fig. 5 is an elevational view of a peeling roll having a modified form of cleaning means associated therewith.

Figure 6 is a fragmentary side elevation of the peeling machine incorporating the modified cleaning means shown in Figure 5.

The peeling machine of my invention generally comprises a bed of peeling rolls or the like over which the fruit is progressed in bulk, which rolls incorporate skin pulling and shredding means to loosen and remove the skin from the product, as it is passing thereover. In the form of the invention shown in Figs. 1 to 3, the machine may comprise a frame 10 which is inclined from the feed end of the machine upwardly and on which a series of peeling rolls 11 are suitably journalled in transverse relation to the direction of travel of the product thereover. The product may be delivered to the peeling rolls over a feed chute 12 and will travel over the rolls in the direction of the arrow in Fig. 1, the peeling rolls being driven in the same direction but at differential speeds so that the product will progress over the rolls by the combined action thereof and the urge of the oncoming product.

To provide the drive for the rolls, the shafts 13 thereof may carry sprockets 14 which are engaged by a chain 15 held in position by suitably formed guides 16. The chain 15 also engages a sprocket 17 on a drive shaft 18 which is suitably journalled on the frame and may be driven by a chain and sprocket drive means 19 from a motor 20. To provide the differential speed relation between the adjacent rolls, alternate sprockets 14 may be of smaller diameter as shown in Fig. 1.

The peeling units or rolls 11 are of special construction and each roll preferably includes a cylindrical body 21 (Figs. 1 to 3) around which a covering strip 22 of suitable smooth material, such as rubber, may be suitably secured to provide means for mounting the peeling points of the rolls. Such points may comprise tacks 23 having their heads 24 held against the roll body 21 by strip 22 with their pointed ends 25 projecting outwardly beyond the strip as seen in Fig. 3. The tacks 23 are preferably arranged in a closely spaced arrangement over the surface of the roll, so that a product engaged with the roll will be pierced simultaneously by a plurality of needle-like shredding and peeling points. Preferably, the array of peeling points are arranged in regular fashion to form cylindrical rows for cooperation with the cleaning means associated therewith. Such cleaning means may comprise a cleaning plate 26 (Figs. 1 and 2) having a series of evenly splaced slots 27 formed in the upper edge with a spacing equal to the spacing between the rows of tacks 23 of the peeling roll. A plate 26 is suitably secured on the frame in cooperative relation below an associated peeling roll, so that the peeling points 25 in passing through the slots 27 will be cleaned and stripped of any adhering peeling or skin of the product.

The operation of the machine will be described in connection with the peeling of tomatoes, and it will be understood that its operation on other products of similar nature will occur in a similar manner. Tomatoes which have been steamed to loosen the skin and which are preferably cored, are fed to the machine over the feed chute 12 onto the peeling rolls which, as previously described, are rotating in the same direction but with a differential speed relation between each pair of adjacent rolls. It will be understood that the number of peeling rolls in the machine will vary with the type of product being peeled, and that the peeling rolls may comprise the entire machine or they may have associated therewith at either end of the peeling section one or more transverse conveying rolls of conventional brush construction.

The tomatoes are fed onto the rolls for progression thereover from valley to valley in a single layer, and are turned about various axes both by the action of the rolls, and by contact between adjacent tomatoes. As a result, in passing over the rolls the entire skin of a tomato will be subjected to the shredding and loosening action of the peeling points 25. The points 25 preferably project beyond the strip 22 a sufficient amount to penetrate only slightly beyond the thickness of the skin. In practice, points have been used which project approximately 1/8" beyond the product supporting surfaces of the roll. When a tomato is resting in the valley between two adjacent rolls, the respective peeling points of the rolls travelling at slightly different speeds will slit the skin and separate loose pieces of skin from the tomato with a gentle pulling action.

The operation continues as the tomatoes progress over the rolls, which progression may be effected by either the urge of oncoming tomatoes or by special advancing means as is well known, so that by the time a tomato has travelled from the feed end to the discharge end of the machine, its entire surface will have been freed of its skin. The cleaning means of each roll serves to strip the pieces of skin which are carried away by the peeling points so as to clean the peeling points before they again contact the product.

In the form of the invention illustrated in Fig. 4, a pair of peeling rolls 31 are provided in parallel relation to provide a longitudinal valley or trough to receive the product units as shown in the figure. The rolls being of the construction shown in Figs. 2 and 3 but arranged with their parallel axes inclined to provide for gravity feed of the product longitudinally thereof. Cleaning plates 32 are associated with the rolls 31 as described in connection with rolls 11. The rolls 31 are preferably also driven in the same direction and in differential speed relation and are of a length to effect peeling of the product during its travel therealong in the same manner as pointed out above.

Fig. 5 illustrates a modified form of cleaning means which may comprise a roll 41 of the construction shown in Figs. 1 or 4, and a roller type cleaning belt 42 of fabric or other suitable material which extends about the peeling roll 41 and an idler roll 43 spaced below the peeling roll. The belt 42 is held in close engagement with the peeling roll during the active product engaging part of its travel so that the peeling points 25 project through the belt 42 during their peeling action, and will be cleaned of any adhering pieces of skin as they are withdrawn, when the path of travel of the belt diverges from the roll surface.

While I have shown and described certain preferred embodiments of the invention, it will be understood that the invention is capable of both variation and modification from the form shown, and the scope of the invention, therefore, should be limited only by the scope of the claims appended hereto.

I claim:

1. A peeling machine for products such as tomatoes, onions and the like, comprising a pair of rotatable rolls forming a product containing trough for progression of the product longitudinally of said rolls along said trough, each roll having a smooth product supporting surface and an array of needle-like peeling points projecting beyond said surface a slight degree and only slightly more than the thickness of the skin of the product to be peeled, and means for driving said rolls in the same direction and in differential speed relation to effect peeling of products supported in said trough.

2. A peeling machine for products such as tomatoes, onions and the like, comprising a series of rotatable peeling rolls mounted in parallel relation to form a plurality of product supporting troughs and to provide for progression of the product from trough to trough transversely of the rolls, each roll having a smooth product supporting surface and an array of needle-like peeling points projecting beyond said surface a slight degree and only slightly more than the thickness of the skin of the product to be peeled, and means for driving said rolls in the same direction and with a differential speed relation between each adjacent pair of rolls to effect peeling of products supported in said troughs.

3. A peeling machine for products such as tomatoes, onions and the like, comprising a pair of adjacent rotatable rolls forming a product containing trough, the surface of at least one of said rolls ccomprising a projecting array of needle-like peeling points, and an endless flexible belt engaging each peeling roll and having a length greater than the circumference of said peeling roll, said points extending beyond said surfaces a slight degree and only slightly more than the thickness of the skin of the product to be peeled, and an auxiliary roll for said flexible belt mounted adjacent each said peeling roll in parallel relation to said roll and disposed opposite the active peeling zone thereof, whereby said belt is pierced by points travelling through the product engaging portion of their path and subsequently serves to clean adhering skin from said points as the points are withdrawn through said belt.

4. A peeling machine for tomatoes, onions and the like, comprising a plurality of rotatable parallel rolls forming a smooth product supporting surface, needle-like projections spaced throughout the surfaces and extending beyond the same a slight degree and only slightly more than the thickness of the skin of the product to be peeled, said rolls being spaced in cooperative relation, and means for driving said rolls in the same direction at different speeds whereby the cooperative reaction of the needles in adjacent rolls slips the skins from the product.

5. A peeling machine for products such as tomatoes, onions and the like, comprising a plurality of smooth endless surfaces cooperating together to support and rotate the product, said smooth surfaces having needle-like projections spaced throughout their area, said projections extending beyond said surfaces a slight degree and only slightly more than the thickness of the skin of the product to be peeled, and means for driving said surfaces in the same direction, and at different speeds, whereby their cooperative reaction tends to slip the skins from the product, and means for removing the skins from the surfaces.

6. A peeling machine for tomatoes, onions and the like comprising a plurality of smooth endless surfaces arranged in spaced parallel relation, and means for driving said surfaces in the same direction and at different speeds, said surfaces having needle-like projections spaced throughout their area, and extending beyond said surfaces a slight degree and only slightly more than the thickness of the skin of the product to be peeled, whereby the cooperative reaction between the needles on adjacent surfaces slip the skins from the product.

ALBERT R. THOMPSON.